Jan. 26, 1926. 1,570,710
C. SCHENCK ET AL
APPARATUS FOR FORMING WHEEL SHAPES
Filed April 27, 1923   5 Sheets-Sheet 4

INVENTORS:
Charles Schenck,
Lewis Fine,
Emil Ibach
BY Clarence Sperry
ATTORNEY

Jan. 26, 1926.                                                                 1,570,710
C. SCHENCK ET AL
APPARATUS FOR FORMING WHEEL SHAPES
Filed April 27, 1923          5 Sheets-Sheet 5
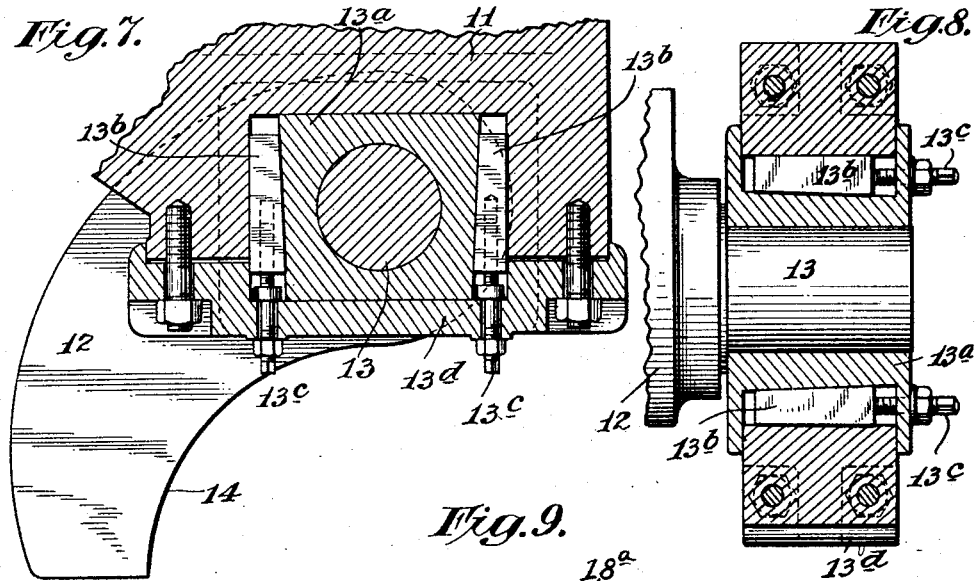
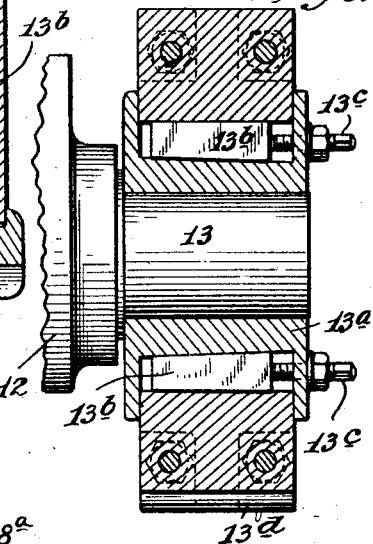
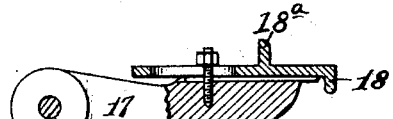
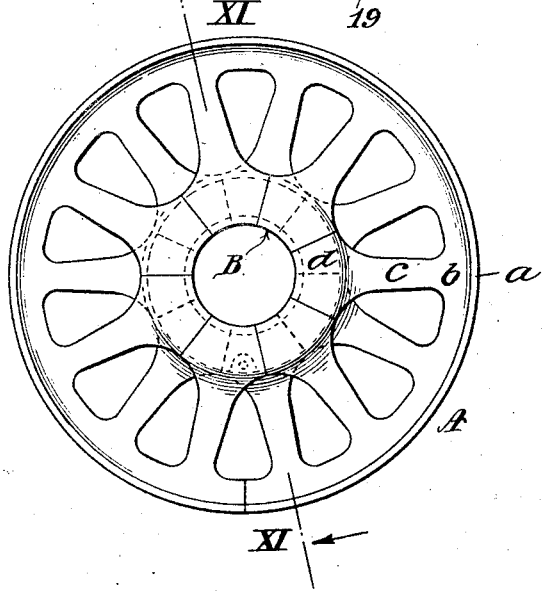
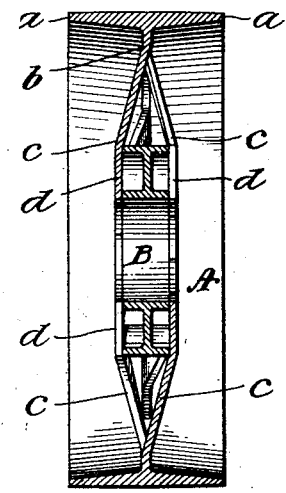
INVENTORS:
Charles Schenck
Lewis Finland
BY Emil I bach
Clarence Kerr
ATTORNEY Patented Jan. 26, 1926.

1,570,710

UNITED STATES PATENT OFFICE.

CHARLES SCHENCK, LEWIS FINE, AND EMIL IBACH, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

APPARATUS FOR FORMING WHEEL SHAPES.

Application filed April 27, 1923. Serial No. 634,953.

*To all whom it may concern:*

Be it known that we, CHARLES SCHENCK, LEWIS FINE, and EMIL IBACH, citizens of the United States, all residing at Bethlehem, Northampton County, Pennsylvania, have jointly invented new and useful Improvements in Apparatus for Forming Wheel Shapes, of which the following is a specification, reference being had to the accompanying drawings, in which—

Figure 1:
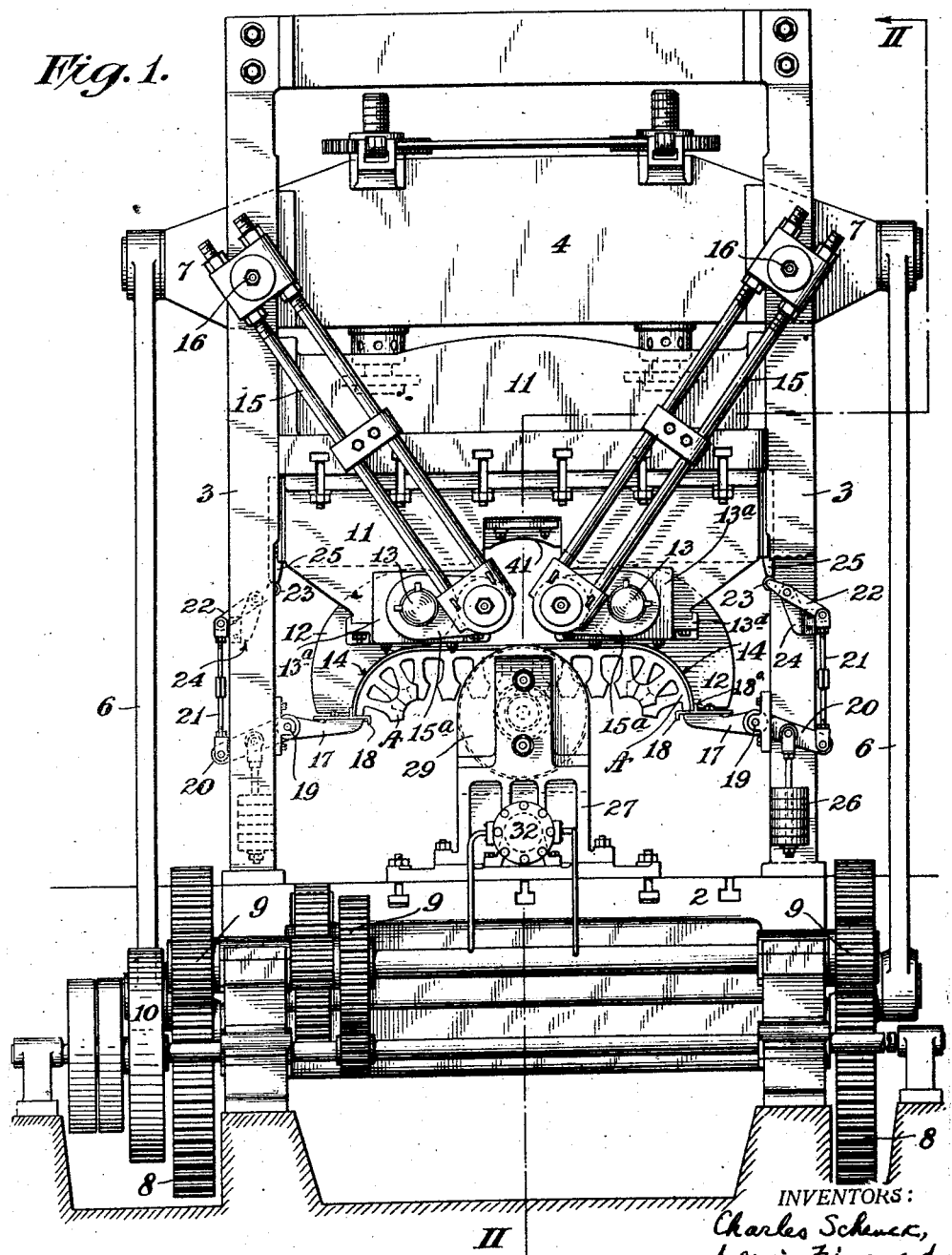
Figure 2:
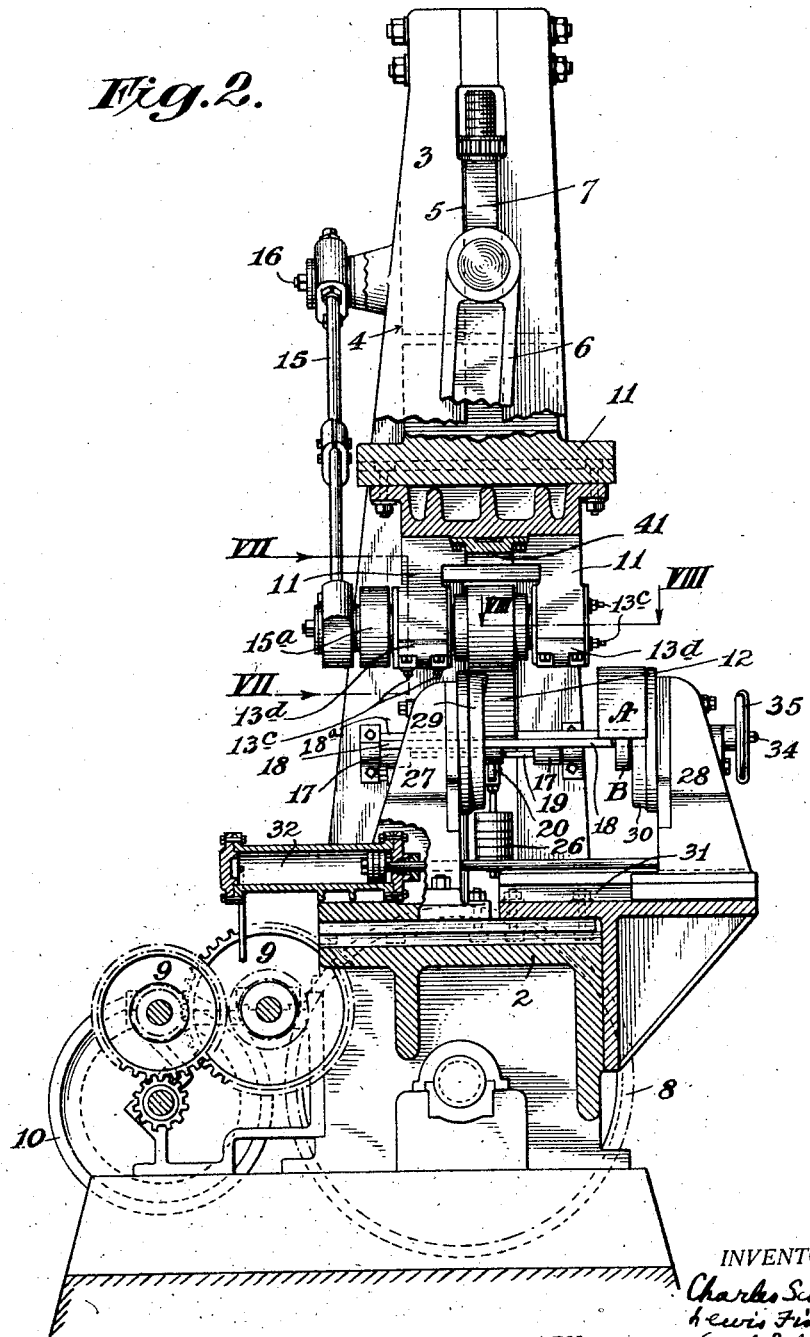
Figure 3:
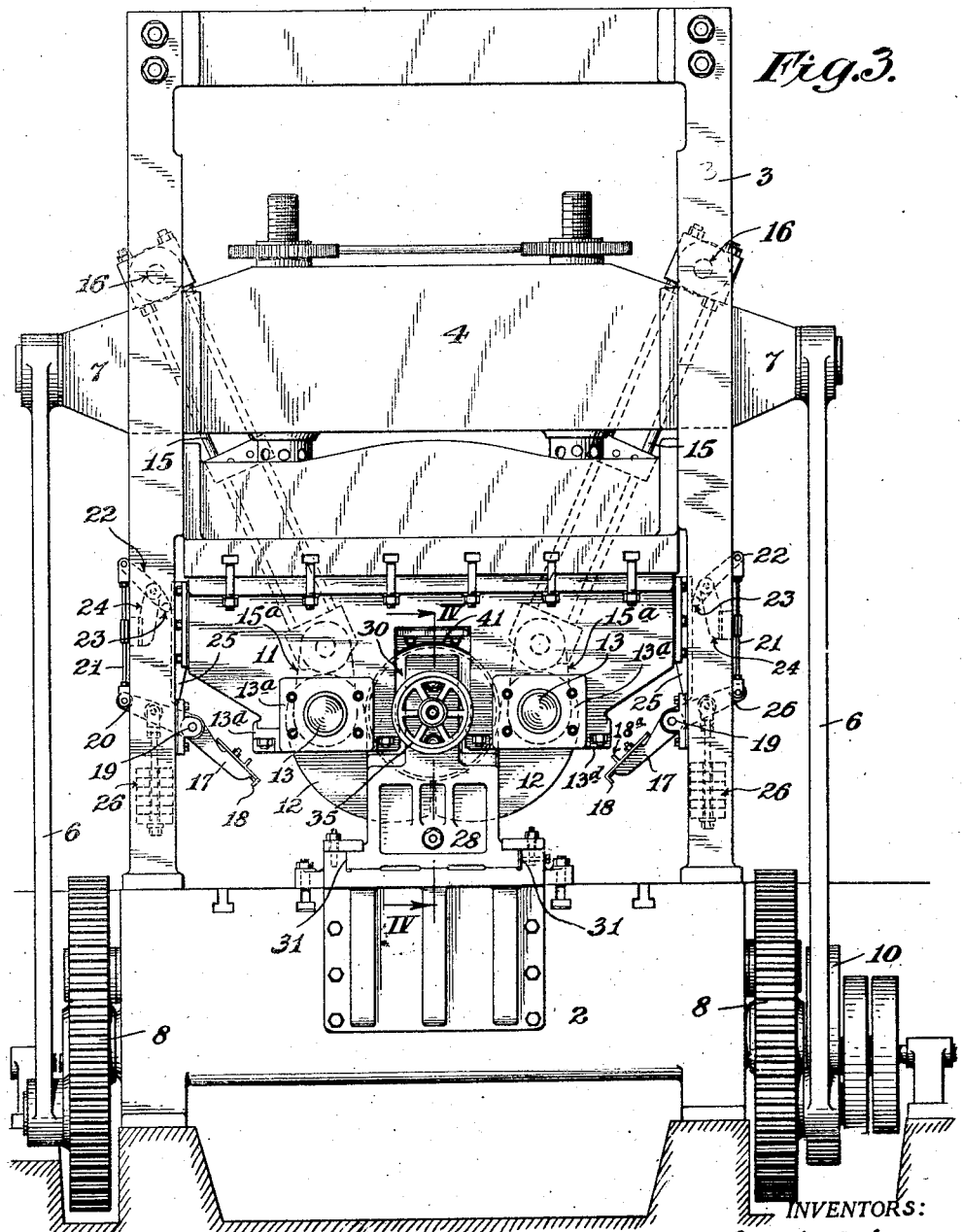
Figure 4:
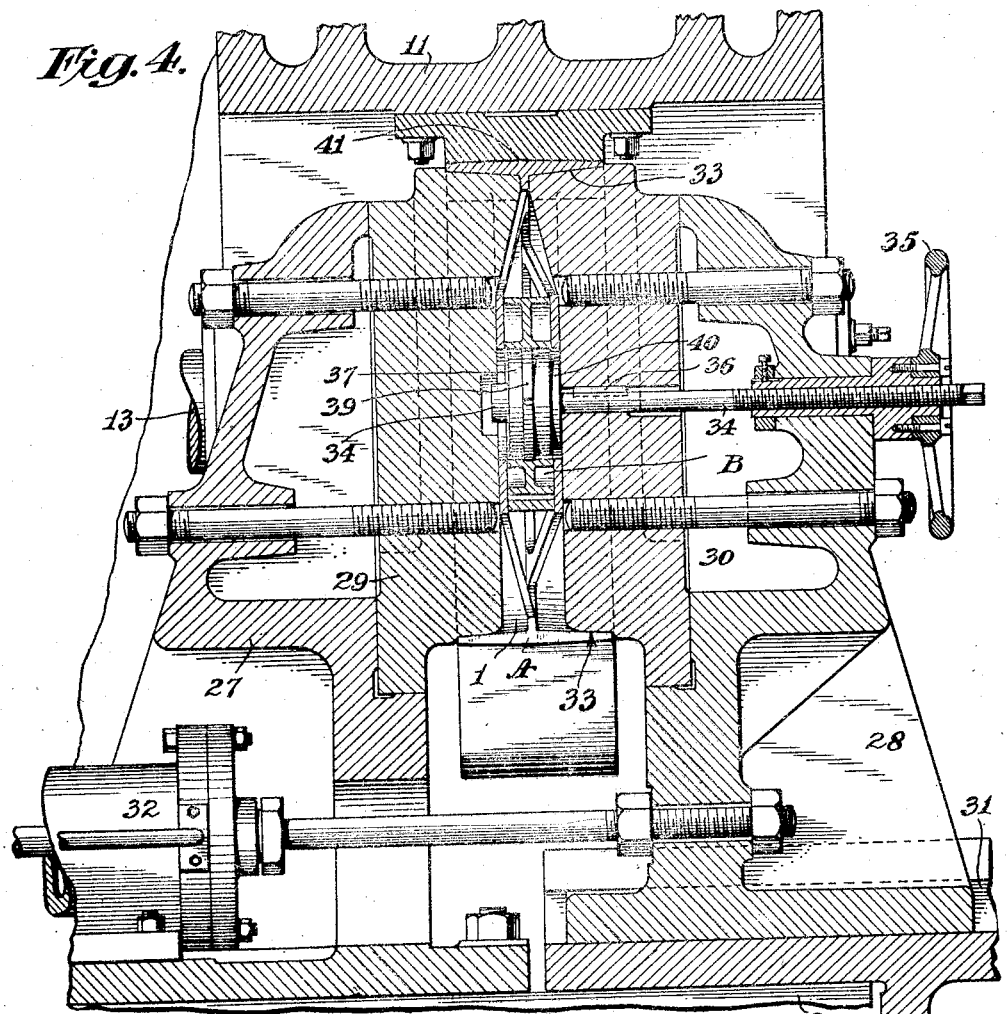
Figure 5:
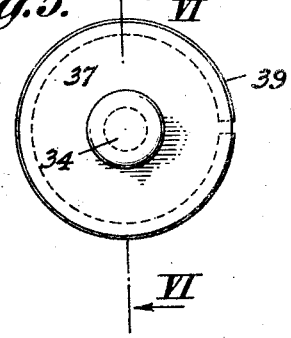
Figure 6:
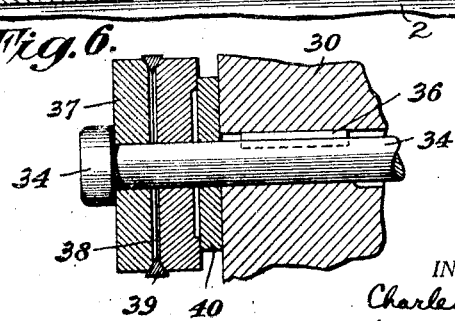

Fig. 1 is a rear elevation of apparatus for bending the ends of a wheel blank, showing a blank therein ready to be operated upon; Fig. 2 is a section on line II—II of Fig. 1; Fig. 3 is a front elevation thereof showing the position of the mechanism at the end of the forming operation; Fig. 4 is a section of the bending dies and their supports (on the line IV—IV of Fig. 3) showing the completely formed wheel shape; Fig. 5 is a detail front elevation of the expanding mandrel; Fig. 6 is a section on line VI—VI of Fig. 5; Fig. 7 is an enlarged sectional view on line VII—VII of Fig. 2 showing a detail of one of the bending cams and mounting; Fig. 8 is a section on line VIII—VIII of Fig. 2 showing a detail of one of the cam pivot bearings; Fig. 9 is a detail of one of the brackets for supporting the wheel blank in operative position; Fig. 10 is an elevation of the completed wheel; and Fig. 11 is a section on line XI—XI of Fig. 10.

Our invention relates to apparatus for forming wheel shapes from flanged beams or sheets, particularly of the type shown in application Serial No. 389,754 of Charles Schenck, Lewis Fine and Emil Ibach, filed June 17, 1920, of which the present application is a continuation in part, and comprises a machine in which a flanged beam or sheet with integral spoke portions extending substantially at right angles thereto is formed into a complete and symmetrical wheel shape with the straight portion forming the rim and the spoke portions extending inwardly along radii of the hub portion of the shape, and a spoke spacing member or separator is incorporated in the shape during the forming operation. Our invention also comprises the various features which we shall hereinafter describe and claim.

Referring to the drawings, A indicates a wheel blank having flanges $a$, a web $b$, and alternately bent spokes $c$ having ends $d$ preferably of keystone shape, and a spoke spacer or separator is indicated as B. The machine has a bed plate 2 and frame 3 in which the press 4 is reciprocated vertically in the guideways 5 of the frame 3 by the crank rods 6. The upper ends of the crank rods 6 are secured to the lateral extensions 7 of the press 4, which project through the guides 5, and the lower ends to the driving gears 8. These driving gears 8 are actuated through a train of gears 9 from any suitable source of power 10. Rigidly attached to and beneath the press 4 are the cam holders 11, in which the cams 12 are supported on the shafts 13. The positions of the bearings $13^a$ for the shafts 13 may be regulated by the wedges $13^b$, which are manipulated by the adjusting screws $13^c$. The bearings $13^a$ are held in position by means of the supports $13^d$, which are detachable to permit the ready replacement of bearings or cams. The cams 12 have their inner faces 14 in the form of a quadrant and are intended to engage the exterior faces of the flanges or rims $a$ of the wheel blanks. The shafts 13 are connected to the link rods 15 by the links $15^a$, which are immovable relative to the shafts 13, but are pivoted to the links 15. At their upper ends the rods 15 are pivotally attached at 16 to the frame of the machine.

The wheel blank centering and supporting mechanism is to be described as follows: Pivoted to the inner side faces of the frames 3 are brackets 17, which have adjustable guides 18 thereon which support and guide the ends of the wheel blank and hold it in position for the forming operation. These guides 18 are so arranged that they may be advanced or retracted toward the axis of the blank to accommodate blanks of varying sizes. Each bracket 17 is pivoted at 19 to a side of the frame 3 and has a rearward extension 20 projecting through a guideway 5. The extension 20 at its rearward end is flexibly connected to a rod 21 which extends upwardly along the outside of the frame and is pivoted at its upper end to a lever 22 having a cam roller 23 on the upper end thereof. This lever 22 is pivotally mounted intermediate its ends on a bracket 24 secured to the frame 3. Depending from the side of the cam holder 11 is a projection 25, which moves vertically with the holder 11 and when it moves downwardly forces the roller 23 downwardly, rotating the lever 22 about its pivot, thus raising the rod 21 and causing the bracket 17 to swing downwardly away from the ends of the wheel blank A and from the cam 12. The rearward extension 20 of the bracket 17 has a counterweight 26 depending therefrom which tends to maintain the bracket 17 in raised position indicated in Fig. 1, in which the projection 25 has permitted roller 23 to rise to uppermost position.

Mounted on the supports 27 and 28 are the forming dies 29 and 30. The support 27, with its forming die 29, is permanently fixed to the base 2, but the support 28, with its forming die 30, is arranged to slide horizontally in the guides 31 of the base, and is preferably actuated by a hydraulic cylinder 32 or other known actuating mechanism. When the dies 29 and 30 are in closed position the distance between them, as is shown in Fig. 4, is such as to afford the necessary clearance space for the wheel blank A, the inner faces of the dies being cut away to give room for the spoke spacing member B and the staggered spokes c of the wheel blank A. The peripheral faces 33 of the dies 29 and 30 are tapered to give a properly shaped bearing seat for the inner tapered face of the wheel flanges a, which is necessary to provide for the proper bending of the wheel and to prevent distortion or buckling of the rim thereof during the bending operation.

Attached to the movable support 28 is a spacer holding device which is comprised of a threaded rod 34 operated by a hand wheel 35 and is supported in bearings 36 in the center of the forming die 30. The rod 34 projects inwardly beyond the inner face of the forming die 30 a distance sufficient to give room for mounting an expanding mandrel thereon to act as a support for the spoke spacing member B. The expanding mandrel consists of the two plates 37, with a V-shaped groove 38 between them in which a split ring 39 triangular in cross section is seated. Rotation of the hand wheel 35 draws the mandrel plates 37 against a bearing plate 40 arranged upon the side of the die 30 and about the rod 34, thereby forcing the split ring 39 outwardly and engaging the inner circumference of the spoke spacing member B, thus holding it securely in place.

The operation of our apparatus is as follows:

With the support 28 in retracted position shown in Fig. 2, the spoke spacing member B is placed upon the mandrel. The wheel blank A, the ends of which have preferably been bent into quadrants, is next put in position, with its ends resting upon the guides 18 and against the shoulders 18a thereon and the under face of one of its flanges a at its center engaging the peripheral face 33 of the die 30, and with its spokes c on either side of the upper half portion of the spoke spacing member B. The wheel 35 is then rotated to cause the split ring 39 of the mandrel to seize the inner circumference of the member B and hold it firmly and securely in operating position.

Actuation of the support 28 by the cylinder 32 next causes the die 30 and the wheel blank A on the die to move toward the die 29 until the dies 29 and 30 are in closed and operating position, as is shown in Fig. 4, with the wheel blank in position between them ready to be operated upon. In moving from open to closed position, as just described, the ends of the wheel blank slide along the supporting guides 18.

The gears 8 and 9 are then set in motion, causing the crank rods 6 to draw down the press 4. As the press 4 begins to descend the projection 25 depresses the roller 23, thereby rotating the lever 22 about its pivot, raising the rod 21 and thereby rotating the supporting guides 18 on the bracket 17 out of the path of the cams 12 and blank. The press 4 and cam holders 11 meanwhile carry down the cams 12, and as the inner ends 12a of the cams 12 are pivotally secured to the lower ends of the link rods 15, which at their upper ends are attached to the frame by fixed pivots 16, this downward movement of the holders 11 causes the cams 12 to rotate about their pivots 13, and as their inner faces 14 engage the rim of the wheel blank near its ends this causes the blank to bend downwardly about the peripheral faces 33 of the dies 29 and 30. The continued downward movement of the press 4 causes the rotation of the cams 12 about their pivots 13, forcing the already bent ends e of the blank A in and about the under side of the peripheral faces of the dies and drawing the unbent middle portion of the blank down about the dies until finally the ends of the blanks meet and the quadrant surface 41 of the cam holder 11 comes into bearing upon the central portion of the rim, thus forcing it snugly down upon the top of the die blocks 29 and 30.

As the press 4 continues to operate, it will then be moved upward by its crank rods 6, thereby causing the cams 12 to release the formed wheel shape A, and as the press 4 continues upward the cams 12 are gradually returned to the open position shown in Fig. 1. As the projections 25 move upwardly, thus permitting the rollers 23 to rise, the counterweights 26 are thus free to cause the brackets 17 to rotate upwardly about their pivots 19, so that when the press 4 has reached its highest point the brackets 17 will again be in position to support a succeeding wheel blank A.

As soon as the cams 12 and the holder 11 have been retracted a sufficient distance to release the die blocks 29 and 30, the cylinder 32 is actuated to slide the support 28 along the guides 31 with the completed wheel A thereon carried by the rod 34. Rotation of the hand wheel 35 relieves the engagement of the expanding mandrel upon the spacer B and the completed wheel shape may then be removed.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:

1. In apparatus for making metal wheels from flanged beams or sheets having web and spoke portions, a split die block having annular projections arranged to support the flanged portion of the wheel blank and to receive between them the web and spoke portions of the blank, and a forming die having arc-shaped faces thereon, the said forming die being movable relatively to the die block and said arc-shaped faces being adapted to engage and bend the blank about the projections of the die block into wheel form.

2. In apparatus for making metal wheels from flanged beams or sheets having web and spoke portions, a split die block having annular projections arranged to support the flanged portion of the wheel blank and to receive between them the web and spoke portions of the blank, a forming die having arc-shaped faces and cam surfaces thereon, and means for tilting the cam surfaces to exert pressure on portions of the flange of the wheel blank.

3. In apparatus for making metal wheels from flanged beams or sheets having web and spoke portions, a split die block having annular projections adapted to support between them the wheel blank, a movable member having pivotally mounted thereon arc-shaped forming surfaces adapted to engage and bend the flange of the blank, and means for tilting the forming surfaces about said pivots as the member moves in one direction.

4. In apparatus for forming metal wheel shapes from flanged blanks with integral spokes, the combination of a pair of axially aligned die members, one of said members being arranged for initial support of a blank and the other of said members being reciprocable axially incident to the insertion of a blank and the removal of a wheel member, and a forming die carrying forming surfaces thereon for bending the blank in wheel shape about the die members.

5. In apparatus for forming metal wheel shapes from flanged blanks with integral spokes, a two part die block, one part of which is reciprocable into and out of forming position, the said part having mounted thereon a false hub and means of adjustment therefor, and a forming die carrying forming surfaces thereon for bending the blank in wheel shape about the die blocks.

6. In apparatus for forming metal wheel shapes from flanged blanks with integral spokes, a two part die block, one part of which is reciprocable into and out of forming position, the said part carrying a support for a spoke spacing member and means for securing the spoke spacer securely thereon, and a forming die carrying forming surfaces thereon for bending the blank in wheel shape about the die blocks.

7. In apparatus for forming metal wheel shapes from flanged blanks with integral spokes, a two part die block having symmetrically formed complementary annular faces, supporting means on one of the blocks for a hub member, and other temporary supporting means for the wheel blank to guide it into operating position, and a forming die carrying forming surfaces thereon for bending the blank in wheel shape about the said annular faces on the die blocks.

8. In apparatus for forming metal wheel shapes from flanged blanks with integral spokes, a two part die block, the two parts being capable of relative movement to permit the insertion of a wheel blank therebetween, a press having forming surfaces thereon, means for reciprocating the press relative to the die blocks to cause the forming surfaces to bend the blank thereabout, a plurality of said forming surfaces being movable, and at least one of said surfaces being fixed, relative to the press during the forming operation.

9. In apparatus for forming metal wheel shapes from flanged blanks with integral spokes, a two part die block, one part being reciprocable into and out of operating position, a press carrying surfaces for forming the wheel blank about the die blocks, a support for the wheel blank along which the blank is moved into operating position, and means operated by the press for removing the support from the path of the forming surfaces carried by the press.

10. In wheel forming apparatus, the combination of a bed plate, a frame supported by the bed plate, an anvil die construction supported by the bed plate, a member reciprocable with respect to said frame, a pair of die members pivotally mounted with respect to the reciprocatory member and having arcuate forming surfaces, crank arms connected to the die members, and links connected to the crank arms and being pivotally connected to the frame.

11. In wheel forming apparatus, the combination of a bed plate, a frame including a pair of spaced standards, an annular anvil member carried by the bed plate, supports pivotally connected to the standards for supporting terminal portions of a blank, a reciprocatory member carried by the frame, a pair of die members having arcuate forming surfaces, shafts connected to the die members and journaled in the reciprocatory member, crank arms carried by the shafts, links connected to the crank arms and to the standards, and means operated by the reciprocatory member when moving in a forming direction to tilt the supports in an out-of-the-way direction.

12. In wheel forming apparatus, the combination of a bed plate, a frame carried by the bed plate, an annular anvil member supported by the bed plate, a member movable with respect to the frame and in a plane transverse to the axis of the anvil member, a plurality of die members pivotally mounted with respect to the movable member and having arcuate forming surfaces, and means responsive to movement of the member toward the anvil member for causing the die members to tilt about their axes to envelop the anvil member and responsive to movement of the member away from the anvil member to cause the die members to tilt about their axes away from the anvil member.

CHARLES SCHENCK.
LEWIS FINE.
EMIL IBACH.